US008332107B2

(12) United States Patent
Matsunaga et al.

(10) Patent No.: US 8,332,107 B2
(45) Date of Patent: Dec. 11, 2012

(54) SHIFT CONTROLLER FOR AUTOMATIC TRANSMISSION (75) Inventors: Hitoshi Matsunaga, Anjo (JP); Kei Kitajima, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 61 days.

(21) Appl. No.: 13/058,023

(22) PCT Filed: Sep. 24, 2009

(86) PCT No.: PCT/JP2009/066522
§ 371 (c)(1),
(2), (4) Date: Feb. 8, 2011

(87) PCT Pub. No.: WO2010/044333
PCT Pub. Date: Apr. 22, 2010

(65) Prior Publication Data
US 2011/0130928 A1    Jun. 2, 2011

(30) Foreign Application Priority Data
Oct. 15, 2008  (JP) ................. 2008-266059

(51) Int. Cl.
*G06F 7/00* (2006.01)
(52) U.S. Cl. .......................................... 701/52; 477/3
(58) Field of Classification Search .............. 701/52, 701/51; 477/3, 116, 62
See application file for complete search history.

(56) References Cited

U.S. PATENT DOCUMENTS

| 4,935,872 A * | 6/1990 | Benford et al. ................. 701/51 |
| 4,936,167 A * | 6/1990 | Mehta ............................ 477/155 |
| 5,103,398 A | 4/1992 | Akiyama |
| 7,704,187 B2 | 4/2010 | Saito et al. |
| 8,135,522 B2 * | 3/2012 | Tabata et al. .................... 701/66 |
| 2005/0075774 A1 * | 4/2005 | Takamoto et al. ............... 701/51 |

FOREIGN PATENT DOCUMENTS

| DE | 3927349 A1 | 2/1990 |
| JP | 05 231528 | 9/1993 |
| JP | 9 264414 | 10/1997 |
| JP | 11 294570 | 10/1999 |

(Continued)

OTHER PUBLICATIONS

German Office Action issued Apr. 2, 2012, in German Patent Application No. 11 2009 001 997.8 (with English translation).

(Continued)

*Primary Examiner* — Behrang Badii
*Assistant Examiner* — Shardul Patel
(74) *Attorney, Agent, or Firm* — Oblon, Spivak, McClelland, Maier & Neustadt, L.L.P.

(57) ABSTRACT

A shift controller for an automatic transmission capable of automatically shifting up in a manual mode is provided. In the shift controller, a hysteresis between an automatic upshift line and a downshift permission line is set to be smaller as the accelerator opening degree decreases. As a result, when the accelerator opening degree is larger and therefore hunting is more likely to occur, it is possible to avoid an excessively small time interval between a downshift and an upshift. On the other hand, when the accelerator opening degree is smaller and therefore hunting is less likely to occur, a manual downshift permission region can be expanded to a higher rotational speed region, whereby a driver's manual downshift request can be satisfied in a higher vehicle speed region.

3 Claims, 6 Drawing Sheets

FOREIGN PATENT DOCUMENTS

| | | |
|---|---|---|
| JP | 2004 257414 | 9/2004 |
| JP | 2004 360605 | 12/2004 |
| JP | 2007 120702 | 5/2007 |
| JP | 2007 139124 | 6/2007 |
| JP | 2007 198413 | 8/2007 |
| JP | 2008 144952 | 6/2008 |

OTHER PUBLICATIONS

International Search Report issued Nov. 2, 2009 in PCT/JP09/066522 filed Sep. 24, 2009.

* cited by examiner

|   | C1 | C2 | C3 | C4 | B1 | B2 | B3 | B4 | F0 | F1 | F2 | F3 |
|---|----|----|----|----|----|----|----|----|----|----|----|----|
| P | × | × | × | × | × | × | × | × | × | × | × | × |
| R | × | × | ○ | × | ◎ | × | × | ○ | × | ○ | × | × |
| N | × | × | × | × | × | × | × | × | × | × | × | × |
| 1st | ○ | × | × | ◎ | × | × | × | ◎ | ○ | × | × | ○ |
| 2nd | ○ | × | × | ◎ | × | ◎ | ○ | × | ○ | ○ | ○ | × |
| 3rd | ○ | × | ○ | ◎ | ◎ | × | △ | × | ○ | ○ | × | × |
| 4th | ○ | ○ | △ | ◎ | × | × | △ | × | ○ | × | × | × |
| 5th | △ | ○ | ○ | × | ○ | × | △ | × | × | × | × | × |
| 6th | △ | ○ | × | × | △ | ○ | △ | × | × | × | × | × |

○ engagement
× disengagement
◎ engagement during engine braking
△ engagement only during driving

SHIFT CONTROLLER FOR AUTOMATIC TRANSMISSION

TECHNICAL FIELD

The present invention relates to shift controllers for automatic transmissions. More particularly, the present invention relates to a technique of expanding a manual shift permission region of an automatic transmission which can automatically shift up in a manual mode (manual shift mode) in which a manual shift can be performed.

BACKGROUND ART

There are conventionally known automatic transmissions with a manual mode, such as, for example, those disclosed in PTLs 1-3. In this type of automatic transmissions, when the manual mode is selected, then if the engine RPM reaches a predetermined upper limit, the transmission automatically shifts up to prevent engine overspeed.

Also, in the manual mode, the transmission can shift down in response to a driver's request. When, however, the transmission shifts down by a driver's downshift operation (an operation of a shift lever), the engine RPM may immediately increase and then the transmission may automatically shift up. In this case, hunting occurs and is annoying to the driver. Therefore, a hysteresis is provided between the RPM of the output shaft at which the transmission automatically shifts up (the output shaft RPM of the automatic transmission) and the RPM of the output shaft at which the transmission is allowed to shift down, thereby preventing the hunting.

Figure 8:
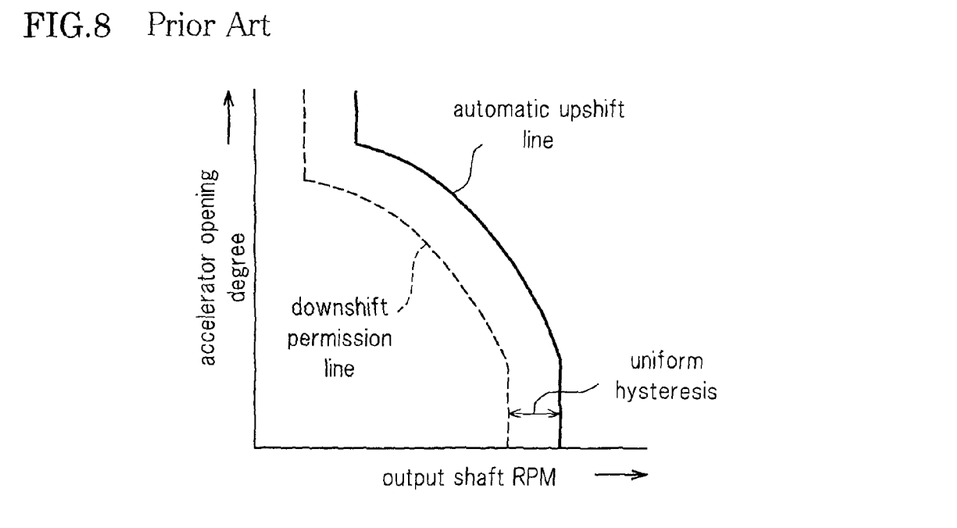
FIG. 8 is a diagram of a conventional automatic upshift map.

Specifically, as shown in FIG. 8, an automatic upshift map defining the output shaft RPM (horizontal axis) and the accelerator opening degree (vertical axis) as parameters is prepared, where an automatic upshift line (solid line) is set in a higher rotational speed region, and a downshift permission line (dashed line) is set in a lower rotational speed region. Thus, the downshift permission line and the automatic upshift line for preventing overspeed are arranged with a predetermined hysteresis being provided therebetween. As a result, the transmission is prevented from automatically shifting up immediately after shifting down in response to a driver's downshift operation, i.e, hunting is prevented from occurring.

CITATION LIST

Patent Literature

PTL1: JP H11-294570 A
PTL2: JP 2007-198413 A
PTL3: JP 2007-139124 A

SUMMARY OF INVENTION

Technical Problem

The hysteresis has been conventionally specified according to technical requirements described below. Specifically, in a region having relatively large accelerator opening degrees, the engine torque is high, and therefore, an increase per unit time in the output shaft RPM is large. Therefore, when the hysteresis is set to be small, then even if a manual downshift is performed in a region where the output shaft RPM is lower than the downshift permission line, the output shaft RPM may subsequently quickly exceed the automatic upshift line, so that the transmission may automatically shift up. Therefore, the hysteresis needs to be set so that the time that it takes for the output shaft RPM to exceed the automatic upshift line after the manual downshift is sufficiently long (even if the output shaft RPM rapidly increases, it takes a predetermined period of time or more for the output shaft RPM to exceed the automatic upshift line (hunting is not induced for that period of time)).

The hysteresis specified according to the above technical requirements has been conventionally set to be uniform over the entire range of the accelerator opening degree.

The present inventors have studied optimization of the hysteresis. As a result, the present inventors have found the following problem which arises when the hysteresis is set to be uniform over the entire accelerator opening degree range as described above.

Specifically, because a relatively large hysteresis, such as that described above, is set in a region having relatively small accelerator opening degrees (the hysteresis is similar to that in the region having relatively large accelerator opening degrees), the downshift permission line is set in a region having considerably low output shaft RPMs (low vehicle speed region) for that region having relatively small accelerator opening degrees.

In this case, when the accelerator opening degree is relatively small, then even if there is a driver's request for a downshift, the downshift cannot be enabled until the vehicle speed decreases to a sufficiently low level. For example, even when there is a request for increasing the engine braking effect by a downshift when driving down a slope, the output shaft RPM may be higher than the downshift permission line because of high vehicle speed, so that a downshift cannot be enabled, and therefore, the driver's downshift request cannot be satisfied. In other words, conventionally, even if a vehicle travels under a situation that the output shaft RPM does not exceed the automatic upshift line in spite of a downshift, and the output shaft RPM cannot rapidly increase to exceed the automatic upshift line after a downshift, the hysteresis is set so that the downshift permission line is provided in the low vehicle speed region. Therefore, a downshift is limited, whereby the manual shift permission region is significantly limited.

The present invention has been made in view of the above problem. It is an object of the present invention to provide a shift controller for an automatic transmission which provides appropriate hysteresis between the automatic upshift line and the downshift permission line to expand the manual shift permission region.

Solution to Problem

—Principle of Solving Problem—

The principle of solution of the present invention to achieve the above object is as follows. The hysteresis is set, depending on a torque generated by a power source for rotation (an engine, etc.), a physical quantity correlating with the torque, or the rotational acceleration of any rotating body on a power transmitting path from the rotation power source to a drive wheel. Specifically, when these values are relatively high and therefore the hunting is more likely to occur, the hysteresis is set to be large. On the other hand, when these values are relatively low and therefore the hunting is less likely to occur, the hysteresis is set to be small. As a result, in the former situation, it is possible to reduce or prevent hunting which is caused by an excessively small time interval between a downshift and an upshift. In the latter situation, the manual shift permission region (downshift permission region) can be expanded to a higher rotational speed region. Therefore, a driver's request (request for a manual downshift) can be satisfied even when the RPM is higher than in the conventional art (e.g., a higher vehicle speed region).

—Solving Means—

Specifically, the present invention provides a shift controller for an automatic transmission capable of shifting in a manual mode in which the automatic transmission shifts down in accordance with a driver's manual downshift operation, and automatically shifting up to decrease a gear ratio when a rotational speed of a rotation power source reaches a predetermined acceptable upper limit speed in the manual mode. A hysteresis is provided between an acceptable upper limit speed of any of rotating bodies which are an output shaft of the automatic transmission, a rotating member in the automatic transmission, and an output shaft of the rotation power source, the acceptable upper limit speed being a rotational speed at which the automatic upshift is enabled, and an upper limit downshift permission speed of the rotating body at which the downshift depending on the manual downshift operation is permitted, and the hysteresis is set, depending on a torque of the rotation power source or a physical quantity correlating with the torque as a parameter.

As used herein, the phrase "when a rotational speed of a rotation power source reaches a predetermined acceptable upper limit speed in the manual mode" includes not only a case where the rotational speed of the rotation power source itself reaches the acceptable upper limit speed, but also a case where the rotational speed of any rotating body on a power transmitting path from the rotation power source to a drive wheel reaches an acceptable upper limit speed.

In the present invention, the physical quantity correlating with the torque of the rotation power source is an opening degree of an accelerator pedal operated by a driver. The hysteresis is preferably set to be smaller as the accelerator opening degree decreases. Also, the hysteresis is preferably set to be smaller as the torque of the rotation power source decreases. Moreover, a hydraulic torque transmitting device (so-called torque converter) is preferably provided between the rotation power source and the automatic transmission. The physical quantity correlating with the torque of the rotation power source is preferably a degree of slipping in the hydraulic torque transmitting device. The hysteresis is preferably set to be smaller as the degree of slipping decreases.

According to the above specific aspects, when, in the manual mode, the rotational speed of the rotation power source reaches an acceptable upper limit speed in a current gearshift level manually set by a driver (e.g., where a gearshift level is set in which a current gear ratio is relatively high, and the vehicle speed is high), the transmission automatically shifts up to decrease the gear ratio. As a result, the rotational speed of the rotation power source is decreased.

When the torque of the rotation power source or a physical quantity correlating with the torque (the accelerator opening degree, the torque of the rotation power source, or the degree of slipping in the hydraulic torque transmitting device) is relatively large, the hysteresis is set to be relatively large so that the rotational speed of the rotating body is prevented from reaching the acceptable upper limit speed quickly after a manual downshift, i.e., it takes a sufficiently long period of time to enable an automatic upshift.

On the other hand, when the physical quantity is relatively small, the torque of the rotation power source is small, and therefore, even if a manual downshift is performed, the rotational speed of the rotating body is less likely to rapidly and significantly increase quickly after the manual downshift. Therefore, in a region where the physical quantity is relatively small, even if the hysteresis is set to be small, it takes a sufficiently long period of time for the rotational speed of the rotating body to reach a speed at which an automatic upshift is enabled. In other words, even if the hysteresis is set to be small, the hunting is not induced. Therefore, in a region where the physical quantity is relatively small, by setting the hysteresis to be small, the downshift permission region can be expanded to a higher rotational speed region.

Thus, the hysteresis is set using the torque of the rotation power source or a physical quantity correlating with the torque as a parameter. Therefore, the manual downshift permission region can be expanded to a higher rotational speed region while the hunting is prevented from occurring.

As a result, a driver's manual downshift request can be satisfied, whereby the operability of the vehicle can be improved.

Other solving means for achieving the above object are illustrated as follows.

Specifically, the present invention provides a shift controller for an automatic transmission capable of shifting in a manual mode in which the automatic transmission shifts down in accordance with a driver's manual downshift operation, and automatically shifting up to decrease a gear ratio when a rotational speed of a rotation power source reaches a predetermined acceptable upper limit speed in the manual mode. A hysteresis is provided between an acceptable upper limit speed of any of rotating bodies which are an output shaft of the automatic transmission, a rotating member in the automatic transmission, and an output shaft of the rotation power source, the acceptable upper limit speed being a rotational speed at which the automatic upshift is enabled, and an upper limit downshift permission speed of the rotating body at which the downshift depending on the manual downshift operation is permitted, and the hysteresis is set, depending on a rotational acceleration of the rotating body as a parameter.

In this case, the hysteresis is preferably set to be smaller as the rotational acceleration of the rotating body decreases.

In this solving means, the hysteresis is preferably set to be smaller as the rotational acceleration of the rotating body decreases. Therefore, an appropriate hysteresis can be set, depending on not only conditions of driving of the rotation power source (the torque of the rotation power source or a physical quantity correlating therewith), but also a road surface condition in which the vehicle is traveling. This will be specifically described hereinafter.

For example, when the vehicle is traveling up a slope, the acceleration of the traveling vehicle may be low although the torque of the rotation power source is large. In such a case, even if a manual downshift is performed, an increase per unit time in the vehicle speed (acceleration) is small. Therefore, in this situation, it takes a sufficiently long period of time for the rotational speed of the rotating body to reach a rotational speed at which an automatic upshift is enabled. Therefore, when the rotational acceleration of the rotating body is small as in this solving means, then even if the hysteresis is set to be small, hunting is not induced, and therefore, the manual downshift permission region can be expanded to a higher rotational speed region.

On the other hand, when the vehicle is traveling down a slope, the acceleration of the traveling vehicle may be high although the torque of the rotation power source is small. In such a case, even if a manual downshift is performed, an increase per unit time in the vehicle speed (acceleration) may be large. Therefore, the hysteresis is set to be relatively large so that the rotational speed of the rotating body is prevented from increasing to a rotational speed at which an automatic upshift is enabled quickly after the manual downshift, i.e., it takes a sufficiently long period of time to enable an automatic upshift.

As described above, according to this solving means, compared to a case where the hysteresis is set, depending on the torque of the rotation power source or a physical quantity correlating therewith (the accelerator opening degree, etc.), a more appropriate hysteresis can be set. Specifically, the manual downshift permission region can be expanded to a higher rotational speed region while preventing the hunting even when the vehicle is traveling on any road surface (uphill or downhill), i.e., without any adverse influence of variations in traveling conditions, resulting in an improvement in the operability of the vehicle.

Moreover, the hysteresis is preferably set by:

$$\text{hysteresis} = \Delta nt/T1 \quad (1)$$

where $\Delta nt$ is a variation per unit time in the rotating body, and $T1$ is a minimum time from a manual downshift to an automatic upshift during which a driver of the vehicle does not feel hunting.

In this case, the hysteresis can be defined only by arbitrarily setting the minimum time from a manual downshift to an automatic upshift during which a driver does not feel hunting, resulting in an improvement in the practicability of the present invention.

Effects of the Invention

In the present invention, the hysteresis is set, depending on the torque of the rotation power source, a physical quantity correlating with the torque, or the rotational acceleration of any rotating body on a power transmitting path from the rotation power source to a drive wheel. Specifically, when these values are relatively high and therefore the hunting is more likely to occur, the hysteresis is set to be large. Conversely, when the torque of the rotation power source, the physical quantity correlating with the torque, or the rotational acceleration of the rotating body is relatively low and therefore the hunting is less likely to occur, the hysteresis is set to be small. As a result, in the former situation, it is possible to reduce or prevent the hunting. In the latter situation, the manual shift permission region can be expanded to a higher rotational speed region.

DESCRIPTION OF INVENTION

An embodiment of the present invention will be described hereinafter with reference to the accompanying drawings. In this embodiment, a case where the present invention is applied to a front-engine, rear-wheel drive (FR) vehicle having an automatic transmission will be described. Firstly, a vehicle powertrain (vehicle drive apparatus) and basic operations of the automatic transmission will be described.

Figure 1:
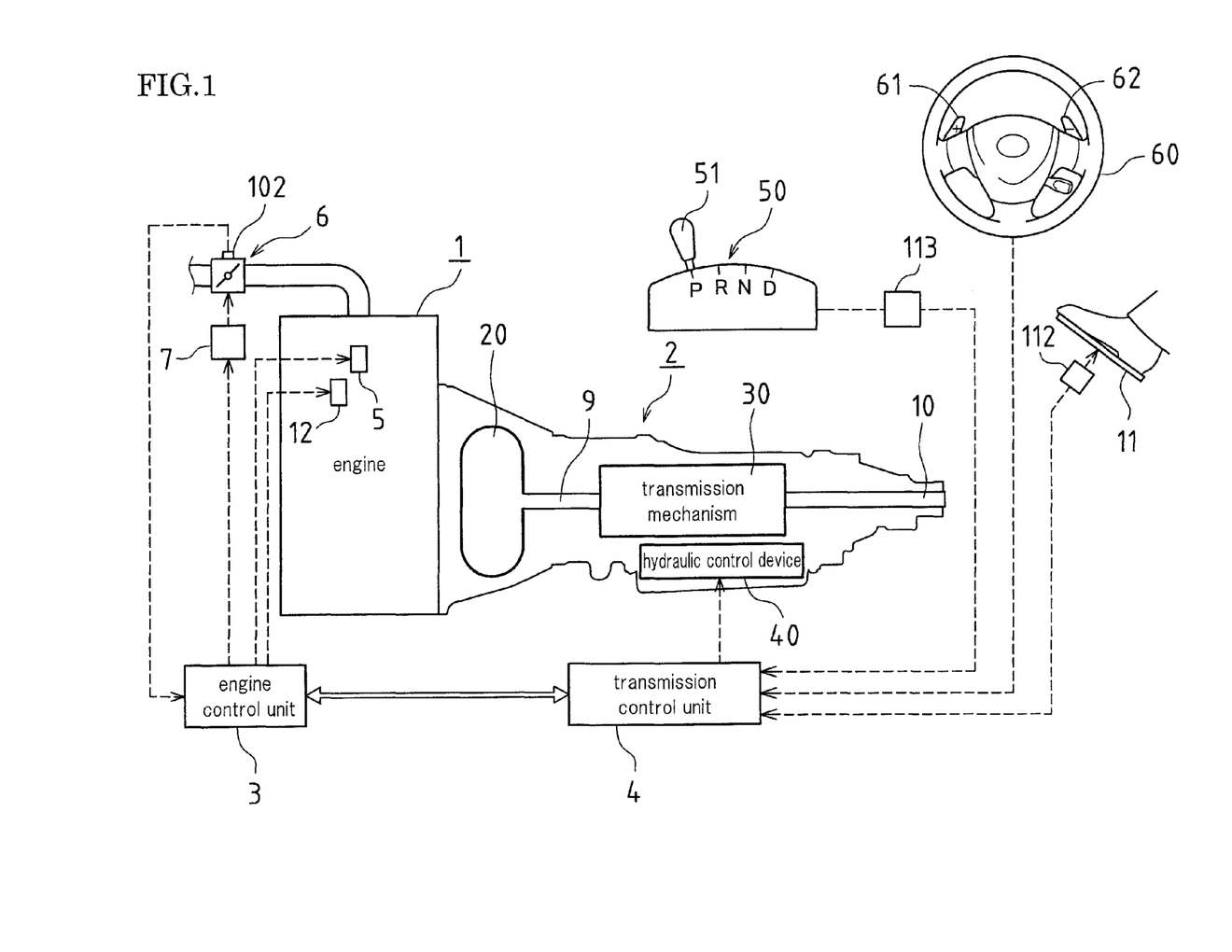
FIG. 1 is a schematic diagram of a configuration of a vehicle powertrain of an embodiment.
Figure 2:
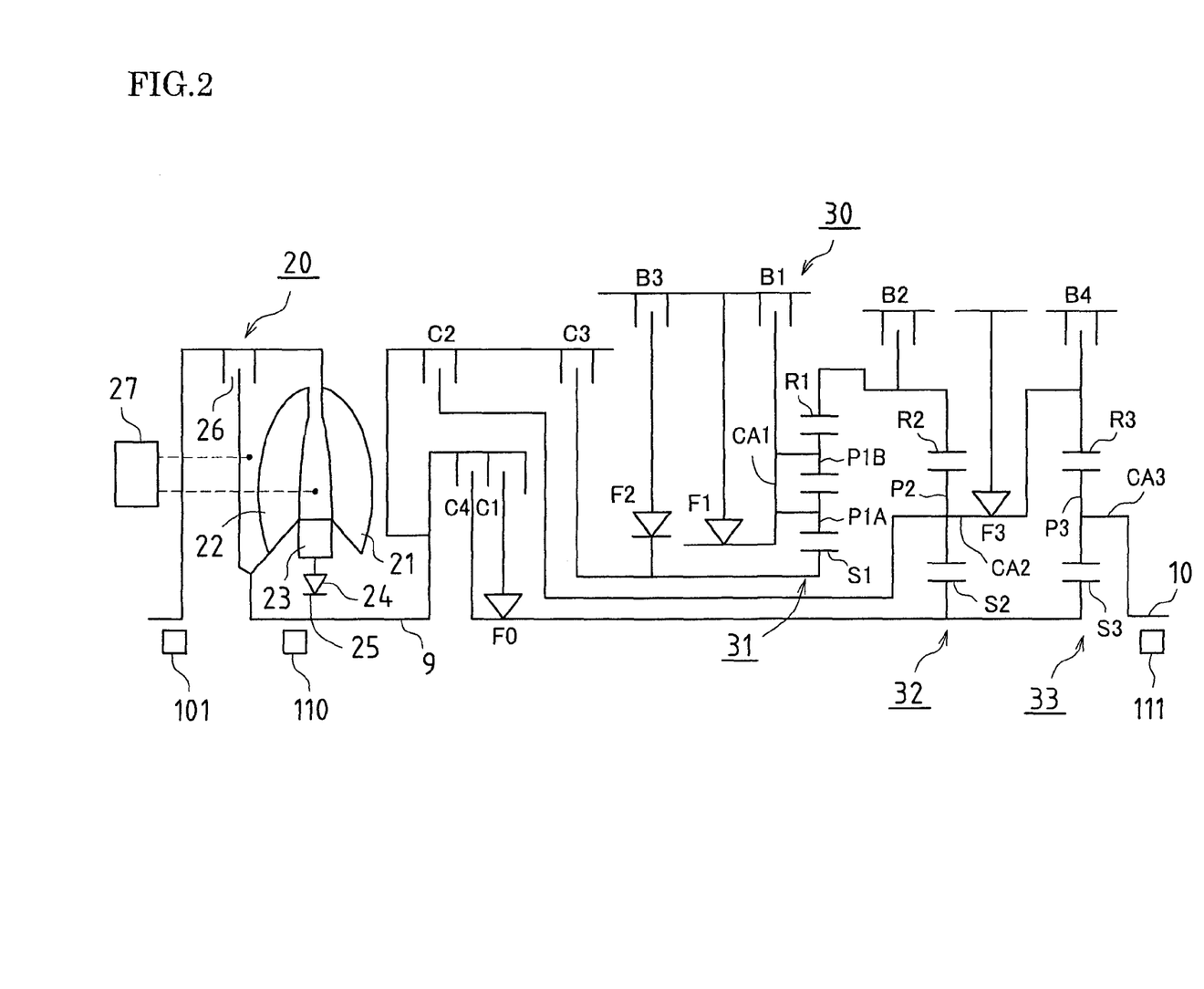
FIG. 2 is a skeleton diagram of an example transmission mechanism in an automatic transmission.
Figure 3:
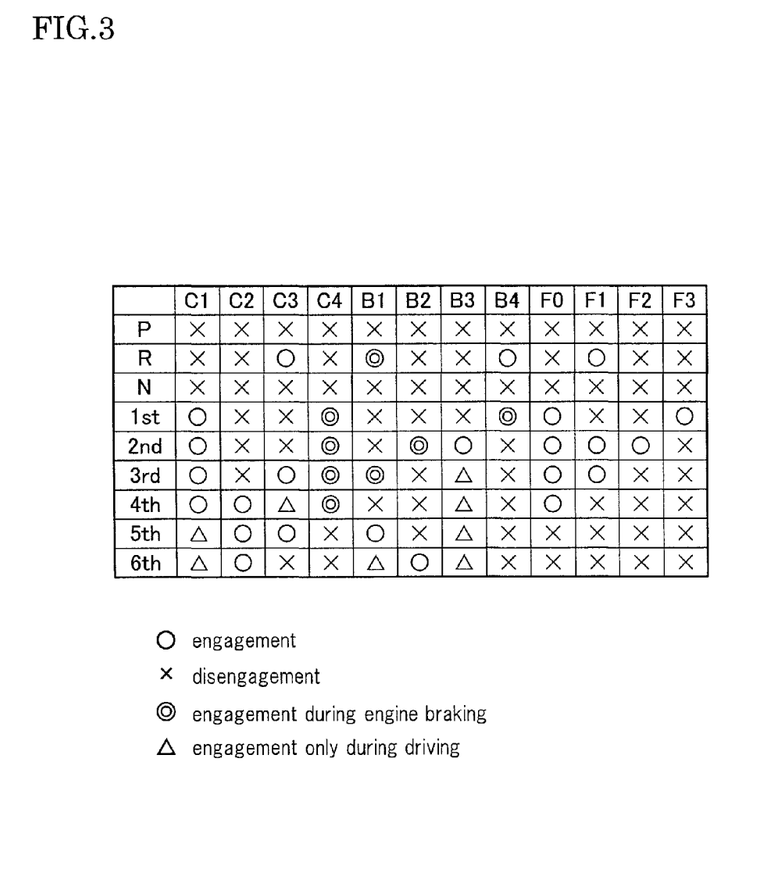
FIG. 3 is a table showing the engaged and disengaged states for each gearshift level of clutches and brakes of the transmission mechanism.

FIG. 1 is a schematic diagram of a configuration of the vehicle powertrain of this embodiment. FIG. 2 is a skeleton diagram of an example transmission mechanism 30 in an automatic transmission 2 of FIG. 1. FIG. 3 is a table showing the engaged and disengaged states for each gearshift level of clutches and brakes of the transmission mechanism 30 of FIG. 2.

In FIG. 1, the vehicle powertrain includes an engine 1 (drive source: rotation power source), the automatic transmission 2, an engine control unit (engine ECU) 3, and a transmission control unit (transmission ECU) 4.

—Engine 1—

The engine 1 is an internal combustion engine in which a mixture of air taken in from the outside and fuel injected by an injector (fuel injection valve) 5 in an appropriate ratio is ignited by a spark plug 12 and burnt, thereby generating rotational force. The amount of intake air is adjusted by a throttle valve 6. The throttle valve 6 is driven by a motor-driven actuator (throttle motor, etc.) 7. The degree of opening of the throttle valve 6 is adjusted by driving the actuator 7 based on the degree of depression of an accelerator pedal 11 or conditions for control. The injector 5 and the actuator 7 are controlled by the engine control unit 3.

—Automatic Transmission 2—

The automatic transmission 2 changes rotational force which is input from the engine 1 to an input shaft 9, and outputs the rotational force via an output shaft 10 to a drive wheel. The automatic transmission 2 mainly includes a torque converter (fluid coupling: hydraulic torque transmitting device) 20, the transmission mechanism 30, a hydraulic control device 40, and the like.

As shown in FIG. 2, the torque converter 20 includes a pump impeller 21, a turbine runner 22, a stator 23, a one-way clutch 24, a stator shaft 25, and a lock-up clutch 26, which are linked to the engine 1.

The lock-up clutch 26 can directly link the pump impeller 21 (input side) and the turbine runner 22 (output side) of the torque converter 20. The lock-up clutch 26 directly engages the pump impeller 21 and the turbine runner 22 (engaged state), disengages the pump impeller 21 from the turbine runner 22 (disengaged state), and causes the pump impeller 21 to slip against the turbine runner 22 (partially engaged state which is an intermediate state between the engaged state and the disengaged state). Those states are switched as required.

The engagement force of the lock-up clutch 26 is controlled by controlling hydraulic fluid pressure applied to the pump impeller 21 and the turbine runner 22 using a lock-up control valve 27.

As shown in FIG. 2, the transmission mechanism 30 mainly includes a first planetary gearset 31, a second planetary gearset 32, a third planetary gearset 33, clutches C1-C4, brakes B1-B4, one-way clutches F0-F3, and the like. The transmission mechanism 30 can provide six forward gear shifts and one reverse gear shift.

The first planetary gearset 31 has a planetary gear mechanism of the double pinion type. The first planetary gearset 31 includes a sun gear S1, a ring gear R1, a plurality of inner pinion gears P1A, a plurality of outer pinion gears P1B, and a carrier CA1.

The sun gear S1 is selectively linked to the input shaft 9 via the clutch C3. The sun gear S1 is also selectively linked to a housing via the one-way clutch F2 and the brake B3 so that reverse rotation (the rotational direction is opposite to that of rotation of the input shaft 9) is prevented. The carrier CA1 is selectively linked to the housing via the brake B1. The reverse rotation of the carrier CA1 is invariably prevented by the one-way clutch F1 provided in parallel with the brake B1. The ring gear R1 is integrally linked to a ring gear R2 of the second planetary gearset 32, and is selectively linked to the housing via the brake B2.

The second planetary gearset 32 has a planetary gear mechanism of the single pinion type. The second planetary gearset 32 includes a sun gear S2, the ring gear R2, a plurality of pinion gears P2, and a carrier CA2.

The sun gear S2 is integrally linked to a sun gear S3 of the third planetary gearset 33, and is selectively linked to the input shaft 9 via the clutch C4. The sun gear S2 is selectively linked to the input shaft 9 via the one-way clutch F0 and the clutch C1 so that the sun gear S2 is prevented from being rotated in a direction relatively opposite to the input shaft 9. The carrier CA2 is integrally linked to a ring gear R3 of the third planetary gearset 33, is selectively linked to the input shaft 9 via the clutch C2, and is selectively linked to the housing via the brake B4. The reverse rotation of the carrier CA2 is invariably prevented by the one-way clutch F3 provided in parallel with the brake B4.

The third planetary gearset 33 has a planetary gear mechanism of the single pinion type. The third planetary gearset 33 includes the sun gear S3, the ring gear R3, a plurality of pinion gears P3, and a carrier CA3. The carrier CA3 is integrally linked to the output shaft 10.

The clutches C1-C4 and the brakes B1-B4 are fluid-operated multi-plate friction engaging devices (friction engaging elements) which utilize the viscosity of oil.

The hydraulic control device 40 engages and disengages the clutches C1-C4 and the brakes B1-B4 of the transmission mechanism 30 separately to establish an optimal gearshift level (first to sixth forward gearshift levels and one reverse gearshift level). The basic configuration of the hydraulic control device 40 is known and therefore will not be described in detail.

Here, conditions for establishment of each gearshift level in the transmission mechanism 30 will be described with reference to FIG. 3.

FIG. 3 is a table showing the engaged and disengaged states for each gearshift level of the clutches C1-C4, the brakes B1-B4, and the one-way clutches F0-F3 of the transmission mechanism 30. In the table, "○" indicates "engagement," "X" indicates "disengagement," "⊚" indicates "engagement during engine braking," and "Δ" indicates "engagement only during driving."

Note that the clutch C1 is called a forward clutch (input clutch). As shown in the table of FIG. 3, the gearshift levels in which a vehicle travels forward, other than the parking position (P), the reverse position (R), and the neutral position (N), are established with the engagement of the clutch —Engine Control Unit 3 and Transmission Control Unit 4—

Figure 4:
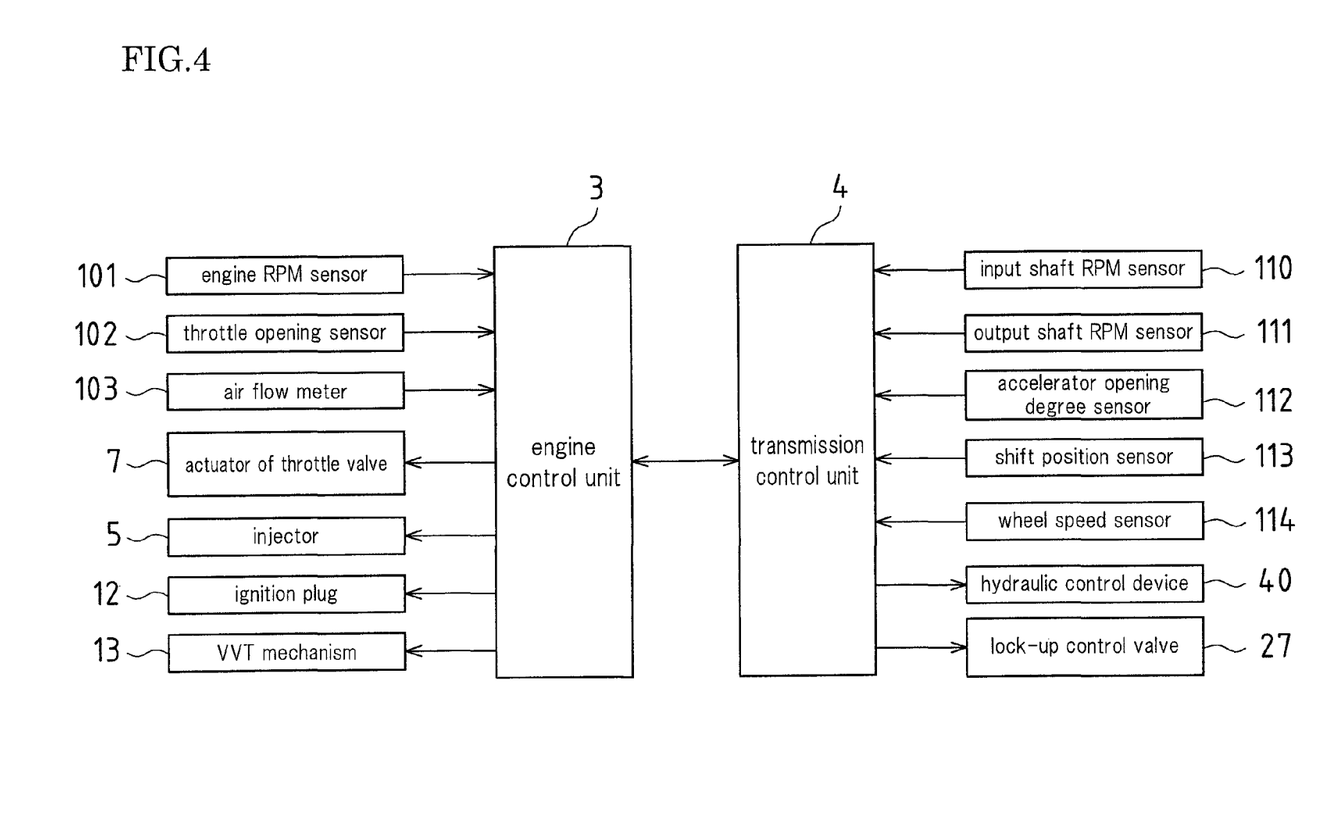
FIG. 4 is a schematic diagram of a configuration of control blocks including an engine control unit and a transmission control unit.

The engine control unit 3 drives the engine 1 by controlling air/fuel mixture supplied to the engine 1 and ignition timing, depending on conditions in which the vehicle is traveling.

The transmission control unit 4 establishes an optimal gearshift level, i.e., a power transmitting path, of the transmission mechanism 30 by controlling the hydraulic control device 40.

The engine control unit 3 and the transmission control unit 4 are connected to each other so that information required for engine control and transmission control are exchanged therebetween.

The engine control unit 3 and the transmission control unit 4 are each a commonly known electronic control unit (ECU), which includes a central processing unit (CPU), a read only memory (ROM), a random access memory (RAM), a non-volatile RAM, and the like.

The ROM stores various control programs, maps which are referenced when the control programs are executed, and the like. The CPU executes calculation processes based on the control programs and the maps stored in the ROM. The RAM is a memory which temporarily stores the result of calculation by the CPU, data input from sensors, and the like. The non-volatile RAM is a non-volatile memory which stores data or the like to be saved when the engine 1 is stopped.

As shown in FIG. 4, various sensors which detect operating conditions of the engine 1, such as an engine RPM sensor 101 which detects the RPM (rotational speed) of the crankshaft of the engine 1, a throttle opening sensor 102 which detects the degree of opening of the throttle valve 6, an air flow meter 103 which detects the amount of intake air, and the like, are connected to the engine control unit 3. These sensors input signals to the engine control unit 3. The engine control unit 3 controls elements of the engine 1, such as the actuator 7 of the throttle valve 6, the injector 5 (the amount of fuel injected and fuel injection timing), the spark plug 12 (ignition timing), a variable valve timing (VVT) mechanism 13 for changing phases of opening and closing timing of an intake/exhaust valve, and the like.

The ROM of the engine control unit 3 stores a torque estimation map for estimating the output torque of the engine 1. By using the torque estimation map, the current output torque of the engine 1 can be estimated based on an engine RPM detected by the engine RPM sensor 101, a degree of throttle opening detected by the throttle opening sensor 102, an amount of intake air detected by the air flow meter 103, an amount of fuel injected by the injector 5, ignition timing of the spark plug 12, and opening and closing timing of the intake/exhaust valve adjusted by the VVT mechanism 13.

An input shaft RPM sensor 110 which detects the RPM (rotational speed) of the input shaft 9, an output shaft RPM sensor 111 which detects the RPM (rotational speed) of the output shaft 10, an accelerator opening degree sensor 112 which detects the opening degree of the accelerator pedal 11 operated by a driver, a shift position sensor 113 which detects a position of the shift lever of the automatic transmission 2, a wheel speed sensor 114 which detects the speed of a drive wheel (wheel speed), and the like are connected to the transmission control unit 4. Note that the wheel speed sensor 114 is provided for each wheel, and is used in an anti-lock brake system (ABS) control to sense a road surface condition.

The transmission control unit 4 outputs a lock-up clutch control signal to the lock-up control valve 27. The lock-up control valve 27 controls engagement pressure applied to the lock-up clutch 26 in accordance with the lock-up clutch control signal to switch between the engaged state (torque conversion condition), the disengaged state (complete slipping condition), and the partially engaged state (slipping condition, also called a flex lock-up condition) of the lock-up clutch 26.

The transmission control unit 4 also outputs a solenoid control signal (hydraulic command signal) to the hydraulic control device 40 of the automatic transmission 2. A linear solenoid valve, an on/off solenoid valve, and the like provided in a hydraulic control circuit of the hydraulic control device 40 are controlled in accordance with the solenoid control signal, to engage or disengage the clutches C1-C4, the brakes B1-B4, and the like of the automatic transmission 2 into predetermined states, thereby establishing predetermined gearshift levels (the first to sixth gearshift levels, the reverse gearshift level, etc.).

—Shift Device 50 and Paddle Switches 61 and 62—

Figure 5:
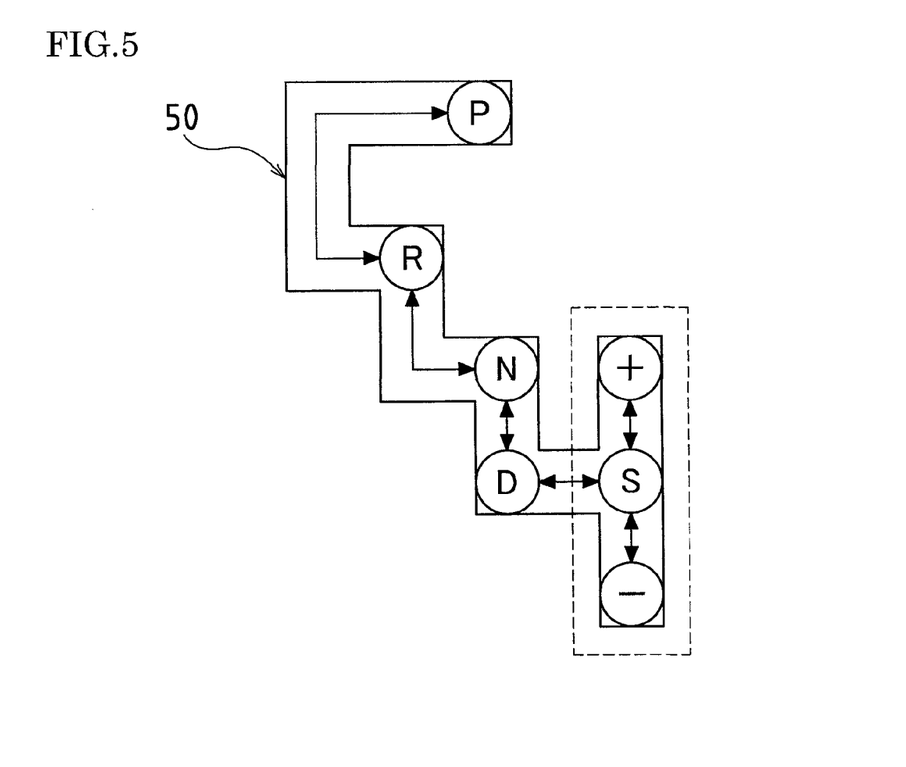
FIG. 5 is a diagram of a shift gate of a shift device.

A shift device 50 is provided in the vicinity of the driver's seat of the vehicle of this embodiment (see FIG. 1). The shift device 50 includes a shift lever 51 which can be moved to different predetermined positions. As shown in FIG. 5, the shift device 50 has a shift gate having a parking (P) position, a reverse (R) position, a neutral (N) position, a drive (D) position, and a sequential (S) position. The shift device 50 allows a driver to move the shift lever 51 to a desired gearshift level position. The parking (P) position, the reverse (R) position, the neutral (N) position, the drive (D) position, and the sequential (S) position (including a "+" position and a "−" position) are detected by the shift position sensor 113.

When the shift lever 51 is in the "drive (D) position," the automatic transmission 2 is in an "automatic shift mode (automatic mode)" and selects gearshift levels in accordance with a shift map described below to perform an automatic shift operation.

On the other hand, when the shift lever 51 is in the "sequential (S) position," the automatic transmission 2 is in a "manual shift mode (manual mode)." The "+" position and the "−" position are provided before and after the S position. The "+" position is a position where the shift lever 51 is operated during a manual upshift, and the "−" position is a position where the shift lever 51 is operated during a manual downshift. When the shift lever 51 is in the S position, then if the shift lever 51 is moved to the "+" position or the "−" position (the S position is a neutral position), the gearshift level of the automatic transmission 2 is raised or lowered. Specifically, the gearshift level is raised by one level every time the shift lever 51 is moved to the "+" position (e.g., 1st→2nd→ . . . →6th). On the other hand, the gearshift level is lowered by one level every time the shift lever 51 is moved to the "−" position (e.g., 6th→5th→ . . . →1st).

As shown in FIG. 1, a steering wheel 60 including paddle switches 61 and 62 is provided in front of the driver's seat of the vehicle of this embodiment. The paddle switches 61 and 62 each have the shape of a lever. The paddle switch 61 is used to output a command signal requesting for shifting up the gearshift level. The paddle switch 62 is used to output a command signal requesting for shifting down the gearshift level. A symbol "+" is drawn on the upshift paddle switch 61, and a symbol "−" is drawn on the downshift paddle switch 62.

When the shift lever 51 is in the "sequential (S) position," i.e., the automatic transmission 2 is in the "manual shift mode," then if the upshift paddle switch 61 is operated (e.g., pulled toward the driver), the gearshift level is raised by one level for each pulling operation (e.g., 1st→2nd→ . . . →6th). On the other hand, if the downshift paddle switch 62 is operated (e.g., pulled toward the driver), the gearshift level is lowered by one level for each pulling operation (e.g., 6th→5th→ . . . →1st).

In this embodiment, a so-called D range paddle active control can also be performed. Specifically, even when the shift lever 51 is in the "drive (D) position," i.e., the automatic transmission 2 is in the "automatic shift mode," a manual shift operation can be performed using the paddle switches 61 and 62. More specifically, when the shift lever 51 is in the "drive (D) position," the automatic transmission 2 is in the "automatic shift mode," and therefore, basically, selects gearshift levels in accordance with a shift map described below to perform an automatic shift operation. In this situation, however, if the upshift paddle switch 61 is operated, the gearshift level is raised, or if the downshift paddle switch 62 is operated, the gearshift level is lowered. Thereafter, if the paddle switch 61 and 62 have not been operated for a predetermined period of time or if the degree of depression of the accelerator pedal 11 exceeds a predetermined value, conditions for returning to the "automatic shift mode" are satisfied, and therefore, the automatic transmission 2 returns to the automatic shift operation which is performed in accordance with the shift map.

—Shift Map—

Figure 6:
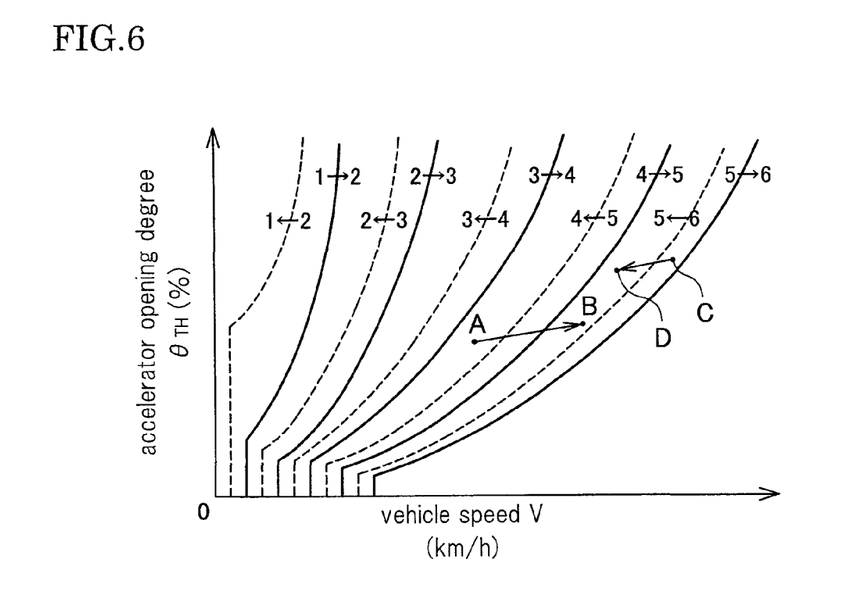
FIG. 6 is a diagram of a shift map used in a shift control.

A shift control of the automatic transmission 2 in the "automatic shift mode" is performed in accordance with a shift map (shift conditions), such as that shown in FIG. 6. The shift map is a map where a vehicle speed V and a accelerator opening degree $\theta_{TH}$ are parameters, and a plurality of regions for obtaining an optimal gearshift level are defined, depending on the vehicle speed V and the accelerator opening degree $\theta_{TH}$. The shift map is stored in the ROM of the transmission control unit 4. The regions of the shift map are separated from each other by a plurality of shift lines (gearshift level switch lines). Note that, in the shift map of FIG. 6, upshift lines (shift lines) are indicated by solid lines, and downshift lines (shift lines) are indicated by dashed lines. A direction in which the gearshift level is changed in an upshift or a downshift is indicated by numerals and an arrow.

—Shift Control Operation of Automatic Transmission 2—

Next, a shift control operation of the automatic transmission 2 thus configured will be described.

Firstly, a case where the shift lever 51 is in the "drive (D) position," i.e., the automatic transmission 2 is in the "automatic shift mode," will be described.

The transmission control unit 4 calculates a vehicle speed V from an output signal of the output shaft RPM sensor 111, and an accelerator opening degree $\theta_{TH}$ from an output signal of the accelerator opening degree sensor 112, and obtains a target gearshift level by referencing the shift map of FIG. 6 based on the vehicle speed V and the accelerator opening degree $\theta_{TH}$. Moreover, the transmission control unit 4 calculates an RPM ratio (an output RPM/an input RPM) from output signals of the input shaft RPM sensor 110 and the output shaft RPM sensor 111 to determine a current gearshift level, and compares the current gearshift level and the target gearshift level to determine whether or not a shift operation is required.

When determining that a shift operation is not required (the current gearshift level is equal to the target gearshift level, i.e., the current gearshift level is optimal), the transmission control unit 4 outputs a solenoid control signal (hydraulic command signal) for maintaining the current gearshift level to the hydraulic control device 40 of the automatic transmission 2.

On the other hand, when the current gearshift level is not equal to the target gearshift level, a shift control is enabled. For example, it is assumed that the vehicle is traveling in the "fourth gearshift level" of the automatic transmission 2. In this case, if the traveling conditions of the vehicle are, for example, changed from a point A to a point B in FIG. 6, the change goes across an upshift line [4→5], and therefore, a target gearshift level calculated from the shift map is the "fifth gearshift level." The transmission control unit 4 outputs a solenoid control signal (hydraulic command signal) for setting the fifth gearshift level to the hydraulic control device 40 of the automatic transmission 2 so that the current gearshift level is changed from the fourth gearshift level to the fifth gearshift level (4→5 upshift).

Also, for example, it is assumed that the vehicle is traveling in the "sixth gearshift level" of the automatic transmission 2. In this case, if the traveling conditions of the vehicle are, for example, changed from a point C to a point D in FIG. 6, the change goes across a downshift line [6→5], and therefore, a target gearshift level calculated from the shift map is the "fifth gearshift level." The transmission control unit 4 outputs a solenoid control signal (hydraulic command signal) for setting the fifth gearshift level to the hydraulic control device 40 of the automatic transmission 2 so that the current gearshift level is changed from the sixth gearshift level to the fifth gearshift level (6→5 downshift). Note that this shift operation of changing the current gearshift level from the sixth gearshift level to the fifth gearshift level is a so-called clutch-to-clutch shift in which the clutch C3 is changed from the disengaged state to the engaged state while the brake B2 is changed from the engaged state to the disengaged state.

On the other hand, even when the shift lever 51 is in the "drive (D) position," i.e., the automatic transmission 2 is in the "automatic shift mode," then if the driver operates the paddle switches 61 and 62, a shift operation (manual shift operation) is performed in accordance with the driver's operation. Specifically, when the automatic transmission 2 is in the "automatic shift mode," then if the upshift paddle switch 61 is operated, a solenoid control signal (hydraulic command signal) for an upshift is output to the hydraulic control device 40 of the automatic transmission 2, so that the gearshift level is raised. On the other hand, if the downshift paddle switch 62 is operated, a solenoid control signal (hydraulic command signal) for a downshift is output to the hydraulic control device 40 of the automatic transmission 2, so that the gearshift level is lowered.

Next, a case where the shift lever 51 is in the "sequential (S) position," i.e., the automatic transmission 2 is in the "manual shift mode," will be described.

As described above, when the automatic transmission 2 is in the "manual shift mode," a shift operation is performed by operating the shift lever 51 and the paddle switches 61 and 62. Specifically, when the shift lever 51 is in the S position (the S position is a neutral position), the current gearshift level is raised by one gearshift level every time the shift lever 51 is moved to the "+" position, and the current gearshift level is lowered by one level every time the shift lever 51 is moved to the "−" position. When the upshift paddle switch 61 is operated, the current gearshift level is raised by one level in one operation, or when the downshift paddle switch 62 is operated, the current gearshift level is lowered by one level in one operation.

—Automatic Upshift—

In the vehicle of this embodiment, when the "manual shift mode" is selected, then if the RPM (rotational speed) of the output shaft 10 detected by the output shaft RPM sensor 111 reaches a predetermined acceptable upper limit RPM (acceptable upper limit speed), i.e., the RPM (rotational speed) of the engine 1 reaches a predetermined acceptable upper limit RPM (acceptable upper limit speed), the automatic transmission 2 automatically shifts up. In other words, an automatic upshift is performed so that the engine RPM does not exceed the acceptable upper limit RPM (overspeed is prevented). In the description which follows, the rotational speed of each rotating body is expressed as "RPM."

Specifically, the acceptable upper limit of the engine RPM is a maximum acceptable RPM which is set in view of the durability of the engine 1 or the like and can be accepted by the engine 1. The acceptable upper limit of the engine RPM is previously determined by experimentation or simulation.

An upshift rule for the automatic upshift operation is defined so that a current gearshift level set by a manual operation is changed to a level higher by one or more levels (to the side on which the gear ratio is lower). Specifically, the acceptable upper limit RPM for enabling the automatic upshift is in the vicinity of the acceptable upper limit RPM which is obtained in view of the durability of the engine 1 or the like, and is previously obtained and set to a value which is lower by a predetermined value than the acceptable upper limit RPM based on experimentation or the like, in view of a rapid increase in the engine RPM caused by, for example, a delay in shifting in response to an upshift.

—Automatic Upshift Map—

Next, a plurality of embodiments of the automatic upshift map, which is referenced during automatic upshift, will be described.

(First Embodiment)

Figure 7:
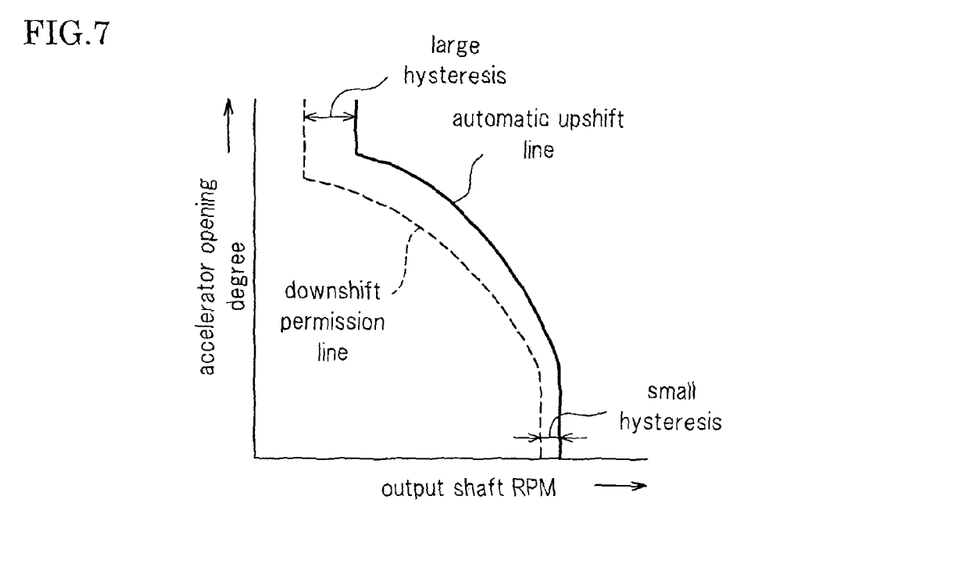
FIG. 7 is a diagram of an automatic upshift map for describing a hysteresis between an automatic upshift line and a downshift permission line in a first embodiment.

FIG. 7 shows an automatic upshift map according to this embodiment. As shown in FIG. 7, the automatic upshift map of this embodiment defines the output shaft RPM (horizontal axis) and the accelerator opening degree (vertical axis: a physical quantity correlating with the engine torque) as parameters. In the automatic upshift map, in the "manual shift mode," the upper limit (acceptable upper limit RPM) of the output shaft RPM is set, depending on the accelerator opening degree, so that the engine RPM does not exceed the predetermined acceptable upper limit RPM. Specifically, when the output shaft RPM reaches the acceptable upper limit RPM, the engine RPM has reached the vicinity of the acceptable upper limit RPM. In this case, the automatic upshift map is set so that the automatic transmission 2 automatically shifts up to decrease the engine RPM.

In FIG. 7, a solid line indicates an automatic upshift line which defines the acceptable upper limit of the output shaft RPM. The automatic upshift line is set so that as the accelerator opening degree increases, the acceptable upper limit of the output shaft RPM decreases. The reason is as follows. As the accelerator opening degree increases, the engine torque increases, and therefore, an increase per unit time in the engine RPM (an acceleration of the engine RPM) increases. In this case, an increase per unit time in the output shaft RPM also increases. Therefore, by starting an automatic upshift before the output shaft RPM becomes high, the engine RPM is reliably prevented from exceeding the acceptable upper limit RPM.

As described above, the automatic upshift map defines the output shaft RPM and the accelerator opening degree as parameters. The ratio of the engine RPM to the output shaft RPM varies depending on the gear ratio (by a difference in gear ratio in the automatic transmission 2). Therefore, the automatic upshift map is separately set for each gearshift level (first to sixth gearshift levels). Specifically, for all the gearshift levels, the automatic upshift line of each automatic upshift map is set to define the acceptable upper limit of the output shaft RPM so that the engine RPM does not exceed the acceptable upper limit RPM. The automatic upshift maps for the gearshift levels are stored in the ROM of the transmission control unit 4. In the description which follows, one automatic upshift map (e.g., an automatic upshift map corresponding to the third gearshift level) will be illustrated.

In the automatic upshift map, a downshift permission line (indicated by a dashed line) is set on the left-hand side of (i.e., in a lower rotational speed region than) the automatic upshift line with a predetermined hysteresis being provided therebetween.

The downshift permission line defines an upper limit of the output shaft RPM which allows a manual downshift, which is manually operated by a driver. Specifically, a manual downshift is forbidden on the right-hand side of (i.e., in a higher output shaft RPM (higher rotational speed) region than) the downshift permission line. As a result, it is possible to prevent the engine RPM from exceeding the acceptable upper limit RPM due to a manual downshift or quickly after a manual downshift.

On the other hand, a manual downshift is permitted on the left-hand side of (i.e., in a lower output shaft RPM (lower rotational speed) region than) the manual downshift permission line. This is because even if a manual downshift is performed in the lower output shaft RPM region, the engine RPM does not exceed the acceptable upper limit RPM.

As described above, the downshift permission line is set on the left-hand side of (i.e., in a lower output shaft RPM (lower rotational speed) region than) the automatic upshift line with a predetermined hysteresis being provided therebetween. By providing the hysteresis, it is possible to prevent hunting that, as described above, the engine RPM increases immediately after the automatic transmission 2 shifts down by a driver's manual downshift operation (operating the shift lever), so that an automatic upshift is enabled.

A feature of this embodiment is that the hysteresis between the automatic upshift line and the downshift permission line decreases as the accelerator opening degree decreases (i.e., a deviation between an output shaft RPM on the automatic upshift line and an output shaft RPM on the downshift permission line decreases). Greater details will be described hereinafter.

In a region having relatively large accelerator opening degrees, the engine 1 has a large amount of intake air and a large amount of fuel injected to produce a high engine torque, and therefore, there is a large increase per unit time in the output shaft RPM. Therefore, when the output shaft RPM is lower than the downshift permission line, then even if a manual downshift is performed, the high engine torque is likely to subsequently cause the output shaft RPM to increase rapidly and significantly. Therefore, in the region having relatively large accelerator opening degrees, a relatively large hysteresis is set so that it takes a sufficiently long period of time for the output shaft RPM to exceed the automatic upshift line (i.e., a hysteresis which ensures at least a predetermined period of time that it takes for the output shaft RPM to exceed the automatic upshift line even if the output shaft RPM rapidly increases (hunting is not induced for that period of time)).

On the other hand, in a region having relatively small accelerator opening degrees, the engine 1 has a small amount of intake air and a small amount of fuel injected to produce a low engine torque, and therefore, there is a small increase per unit time in the output shaft RPM. Therefore, when the output shaft RPM is lower than the downshift permission line, then if a manual downshift is performed, the low engine torque does not subsequently cause the output shaft RPM to increase rapidly and significantly. Therefore, in the region having relatively small accelerator opening degrees, even if the hysteresis is set to be small, it takes a sufficiently long period of time for the output shaft RPM to exceed the automatic upshift line.

Based on the above idea, the downshift permission line is set so that as the accelerator opening degree decreases, the hysteresis gradually decreases. For example, a hysteresis where the accelerator opening degree is zero is set at about ⅓ of a hysteresis where the accelerator opening degree is maximum. The present invention is not limited to this.

Also, as described above, the automatic upshift maps are separately set for the respective gearshift levels (first to sixth gearshift levels). Therefore, in each of all the automatic upshift maps, the downshift permission line is set so that as the accelerator opening degree decreases, the hysteresis gradually decreases. Moreover, when comparing the automatic upshif maps, a larger hysteresis is set for an automatic upshift map corresponding to a lower gearshift level (a higher gear ratio). This is because even when the accelerator opening degree is the same, a lower gearshift level produces a higher vehicle acceleration (a larger increase per unit time in the RPM of the output shaft 10), and therefore, the hunting is more likely to occur in a lower gearshift level.

As described above, in this embodiment, the hysteresis is set to be smaller as the opening degree of the accelerator pedal operated by the driver decreases. Conversely, the hysteresis is set to be larger as the opening degree of the accelerator pedal operated by the driver increases.

Therefore, when the accelerator opening degree is relatively large and therefore the hunting is more likely to occur, the hysteresis is set to be larger, whereby it is possible to prevent the hunting which is caused when a time interval between a downshift and an upshift is excessively small. As a result, the problem that the hunting occurs to annoy the driver can be avoided.

On the other hand, when the accelerator opening degree is relatively small and therefore the hunting is less likely to occur, the hysteresis is set to be smaller, whereby the manual shift permission region (manual downshift permission region) can be expanded to a higher rotational speed region, and therefore, a driver's request (request for a manual downshift) can be satisfied even when the RPM is higher than in the conventional art. Therefore, for example, when there is a request for increasing the engine braking effect by a downshift when driving down a slope, in this embodiment a manual downshift can be enabled to satisfy the driver's downshift request, resulting in an improvement in the operability of the vehicle.

Although, in the above embodiment, the hysteresis is changed, depending on the accelerator opening degree, the degree of throttle opening can be used instead of the accelerator opening degree. Specifically, the hysteresis is set to be smaller as the degree of throttle opening detected by the throttle opening sensor 102 decreases. Conversely, the hysteresis is set to be larger as the degree of throttle opening increases.

Although, in the above embodiment, the output shaft RPM is used as a parameter of the automatic upshift map, the RPM of a rotating member (various gears and shafts) in the automatic transmission 2 or the RPM of a crankshaft which is the output shaft of the engine 1 may be used instead of the output shaft RPM.

(Second Embodiment)

Next, a second embodiment will be described. An automatic upshift map of this embodiment defines the output shaft RPM and the engine torque as parameters. In the automatic upshift map, in the "manual shift mode," the acceptable upper limit of the output shaft RPM is set, depending on the engine torque, so that the engine RPM does not exceed the predetermined acceptable upper limit RPM. Specifically, when the output shaft RPM reaches the acceptable upper limit RPM which is set, depending on the engine torque, an automatic upshift is enabled. The other configuration and control operations are similar to those of the first embodiment. Therefore, only different points between the first and second embodiments will be described hereinafter.

In the automatic upshift map of this embodiment, the engine torque is used instead of the accelerator opening degree for the vertical axis of the automatic upshift map of the first embodiment (see FIG. 7), and a similar automatic upshift line and downshift permission line are used. Therefore, the automatic upshift map of this embodiment is not shown. Specifically, also in this embodiment, the downshift permission line and the automatic upshift line are arranged with a predetermined hysteresis being provided therebetween. As the engine torque decreases, the hysteresis is set to be smaller (a deviation between an output shaft RPM on the automatic upshift line and an output shaft RPM on the downshift permission line decreases).

Note that the engine torque can be obtained based on output signals of various sensors as described above. Specifically, a torque estimation map for estimating a current output torque of the engine 1 is stored in the ROM of the engine control unit 3. By using the torque estimation map, the current output torque of the engine 1 is estimated based on an engine RPM detected by the engine RPM sensor 101, a degree of throttle opening detected by the throttle opening sensor 102, an amount of intake air detected by the air flow meter 103, an amount of fuel injected by the injector 5, ignition timing of the spark plug 12, opening and closing timing of the intake/exhaust valve adjusted by the VVT mechanism 13, and the like.

By thus defining an automatic upshift map using the output shaft RPM and the engine torque as parameters, advantages similar to those of the first embodiment can be obtained.

Specifically, when the engine torque is relatively large and therefore the hunting is more likely to occur, the larger hysteresis can prevent the hunting which would otherwise be caused by an excessively small time interval between a downshift and an upshift. As a result, the problem that the hunting occurs to annoy a driver can be avoided.

On the other hand, when the engine torque is relatively small and therefore the hunting is less likely to occur, the smaller hysteresis can expand the manual shift permission region (manual downshift permission region) to a higher rotational speed region. As a result, a driver's request (request for a manual downshift) can be satisfied even when the RPM is higher than in the conventional art, resulting in an improvement in the operability of the vehicle.

(Third Embodiment)

Next, a third embodiment will be described. An automatic upshift map of this embodiment defines the output shaft RPM and a degree of slipping (a physical quantity correlating with the engine torque) in the torque converter 20, i.e., a difference in rotation between the pump impeller 21 and the turbine runner 22 (the RPM of the pump impeller 21—the RPM of the turbine runner 22), as parameters. In the automatic upshift map, in the "manual shift mode," the acceptable upper limit of the output shaft RPM is set, depending on the degree of slipping, so that the engine RPM does not exceed the predetermined acceptable upper limit RPM. Specifically, when the output shaft RPM reaches the acceptable upper limit RPM which is set, depending on the degree of slipping, an automatic upshift is enabled. The other configuration and control operations are similar to those of the first embodiment. Therefore, only different points between the first and third embodiments will be described hereinafter.

In the automatic upshift map of this embodiment, the degree of slipping in the torque converter 20 is used instead of the accelerator opening degree for the vertical axis of the automatic upshift map of the first embodiment (see FIG. 7), and a similar automatic upshift line and downshift permission line are used. Therefore, the automatic upshift map of this embodiment is not shown. Specifically, also in this embodiment, the downshift permission line and the automatic upshift line are arranged with a predetermined hysteresis being provided therebetween. As the degree of slipping in the torque converter 20 decreases, the hysteresis is set to be smaller (a deviation between an output shaft RPM on the automatic upshift line and an output shaft RPM on the downshift permission line decreases).

Note that the degree of slipping in the torque converter 20 is calculated from a deviation between an RPM of the crankshaft detected by the engine RPM sensor 101 and an RPM of the input shaft 9 detected by the input shaft RPM sensor 110. This deviation (the degree of slipping in the torque converter 20) correlates with the engine torque. As the engine torque increases, the deviation (the degree of slipping) increases. In other words, an increase per unit time in the output shaft RPM increases. Therefore, changing the hysteresis, depending on the degree of slipping in the torque converter 20, is equivalent to changing the hysteresis, depending on the engine torque.

By thus defining an automatic upshift map using the output shaft RPM and the degree of slipping in the torque converter 20 as parameters, advantages similar to those of the first embodiment can be obtained.

Specifically, when the degree of slipping in the torque converter 20 is large, it can be estimated that the engine torque is also relatively large, and therefore, the hunting is more likely to occur. In this case, the hysteresis is set to be large. Therefore, it is possible to prevent the hunting which would otherwise be caused by an excessively small time interval between a downshift and an upshift. As a result, the problem that the hunting occurs to annoy a driver can be avoided.

On the other hand, when the degree of slipping in the torque converter 20 is small, it can be estimated that the engine torque is also relatively small, and therefore, the hunting is less likely to occur. In this case, the hysteresis is set to be small. Therefore, it is possible to expand the manual shift permission region (manual downshift permission region) to a higher rotational speed region. As a result, a driver's request (request for a manual downshift) can be satisfied even when the RPM is higher than in the conventional art, resulting in an improvement in the operability of the vehicle.

(Fourth Embodiment)

Next, a fourth embodiment will be described. An automatic upshift map of this embodiment defines the output shaft RPM and an increase per unit time in the output shaft RPM (a rotational acceleration of the output shaft 10) as parameters. In the automatic upshift map, in the "manual shift mode," the acceptable upper limit of the output shaft RPM is set, depending on the rotational acceleration of the output shaft 10, so that the engine RPM does not exceed the predetermined acceptable upper limit RPM. Specifically, when the output shaft RPM reaches the acceptable upper limit RPM, an automatic upshift is enabled. The other configuration and control operations are similar to those of the first embodiment. Therefore, only different points between the first and fourth embodiments will be described hereinafter.

In the automatic upshift map of this embodiment, the rotational acceleration of the output shaft 10 is used instead of the accelerator opening degree for the vertical axis of the automatic upshift map of the first embodiment (see FIG. 7), and a similar automatic upshift line and downshift permission line are used. Therefore, the automatic upshift map of this embodiment is not shown. Specifically, also in this embodiment, the downshift permission line and the automatic upshift line are arranged with a predetermined hysteresis being provided therebetween. As the rotational acceleration of the output shaft 10 decreases, the hysteresis is set to be smaller (a deviation between an output shaft RPM on the automatic upshift line and an output shaft RPM on the downshift permission line decreases).

Note that the rotational acceleration of the output shaft 10 can be obtained as a variation per unit time in the RPM (rotational speed) of the output shaft 10 detected by the output shaft RPM sensor 111.

By thus defining an automatic upshift map using the output shaft RPM and the rotational acceleration of the output shaft 10 as parameters, the following advantages can be obtained.

Specifically, according to this embodiment, an appropriate hysteresis can be set, depending on conditions of a road surface on which the vehicle is traveling, in addition to conditions of driving of the engine 1 (the torque of the engine 1 or a physical quantity correlating therewith).

For example, when the vehicle is traveling up a slope, the acceleration of the traveling vehicle may be low although the torque of the engine 1 is large. In such a case, even if a manual downshift is performed, an increase per unit time in the vehicle speed (acceleration) is small. Therefore, in this situation, it takes a sufficiently long period of time for the RPM of the output shaft 10 to reach an RPM where an automatic upshift is enabled (an output shaft RPM on the automatic upshift line). Therefore, in this embodiment, when the rotational acceleration of the output shaft 10 is small, then even if the hysteresis is set to be small, the hunting is not induced, and therefore, the manual downshift permission region can be expanded to a higher rotational speed region.

On the other hand, when the vehicle is traveling down a slope, the acceleration of the traveling vehicle may be high although the torque of the engine 1 is small. In such a case, even if a manual downshift is performed, an increase per unit time in the vehicle speed (acceleration) may be large. Therefore, the hysteresis is set to be relatively large so that the RPM of the output shaft 10 is prevented from increasing to an RPM where an automatic upshift is enabled (an output shaft RPM on the automatic upshift line) quickly after the manual downshift, i.e., it takes a sufficiently long period of time to enable an automatic upshift.

More specifically, in this embodiment, an example method of setting the hysteresis will be described hereinafter.

The hysteresis is defined:

$$\text{hysteresis} = \Delta nt/T1 \qquad (1)$$

where $\Delta nt$ is a variation per unit time in the RPM of the output shaft 10 (a rotational acceleration of the output shaft 10), and T1 is a minimum time from a manual downshift to an automatic upshift during which a driver of the vehicle does not feel hunting.

Specifically, the hysteresis is set to a value which is obtained by dividing the rotational acceleration of the output shaft 10 by the minimum time from a manual downshift to an automatic upshift during which a driver of the vehicle does not feel hunting.

Therefore, the hysteresis can be defined only by arbitrarily setting the minimum time (T1) from a manual downshift to an automatic upshift during which a driver of the vehicle does not feel hunting, resulting in an improvement in the practicability of the present invention.

As described above, according to this embodiment, compared to a case where the hysteresis is set, depending on the torque of the engine 1 or a physical quantity correlating therewith (the accelerator opening degree, etc.), a more appropriate hysteresis can be set. Specifically, the manual downshift permission region can be expanded to a higher rotational speed region while preventing the hunting even when the vehicle is traveling on any road surface (uphill or downhill), i.e., without any adverse influence of variations in traveling conditions, resulting in an improvement in the operability of the vehicle.

Although, in the above embodiment, the hysteresis is changed, depending on the rotational acceleration of the output shaft 10, the rotational acceleration of any rotating body provided on a power transmitting path from the engine 1 to a drive wheel, such as a rotational acceleration of the input shaft 9 detected by the input shaft RPM sensor 110, an engine RPM detected by the engine RPM sensor 101, or the like, can be used instead of the rotational acceleration of the output shaft 10. Specifically, the hysteresis is set to be smaller as the rotational acceleration of the rotating body decreases. Conversely, the hysteresis is set to be larger as the rotational acceleration of the rotating body increases.

—Other Embodiments—

In the above embodiments, the present invention is applied to the FR vehicle including the automatic transmission 2 having the six forward gear shifts. The present invention is not limited to this, and is also applicable to vehicles including an automatic transmission having five or eight forward gear shifts or the like, front-engine, front-wheel drive (FF) vehicles, and four-wheel drive vehicles, and the like.

Also, in the above embodiments, the present invention is applied to the vehicle including a gasoline engine. The present invention is also applicable to vehicles including other engines, such as a diesel engine and the like. The power source for the vehicle may be an electric motor or a hybrid type power source including both an engine and an electric motor in addition to engines (internal combustion engines).

Also, in the above embodiments, an automatic upshift and downshift permission are performed in accordance with an automatic upshift map. Alternatively, the timing of an automatic upshift may be set or the presence or absence of downshift permission may be determined in accordance with a predetermined mathematical formula.

The present invention can be embodied and practiced in other different forms without departing from the spirit and essential characteristics thereof. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

This application claims priority on Patent Application No. 2008-266059 filed in Japan on Oct. 15, 2008, which is hereby incorporated by reference in its entirety. All documents cited herein are also specifically incorporated by reference in their entirety.

REFERENCE SIGNS LIST 1 engine (rotation power source)
2 automatic transmission
10 output shaft
20 torque converter (hydraulic torque transmitting device)
112 accelerator opening degree sensor

The invention claimed is:

1. A shift controller for an automatic transmission capable of shifting in a manual mode in which the automatic transmission shifts down in accordance with a driver's manual downshift operation, and automatically shifting up to decrease a gear ratio when a rotational speed of a rotation power source reaches a predetermined acceptable upper limit speed in the manual mode, wherein a hysteresis for forbidding the downshift caused by the driver's manual downshift operation is provided between an acceptable upper limit speed of any of rotating bodies which are an output shaft of the automatic transmission, a rotating member in the automatic transmission, and an output shaft of the rotation power source, the acceptable upper limit speed being a rotational speed at which the automatic upshift is enabled in the manual mode, and an upper limit downshift permission speed which is an upper limit of a rotational speed of the rotating body in a manual downshift permission region in which the downshift is performed in accordance with the driver's manual downshift operation in the manual mode, the hysteresis is set, depending on a rotational acceleration of the rotating body as a parameter, the hysteresis is set to be smaller as the rotational acceleration of the rotating body decreases, whereby the manual downshift permission region where the downshift is performed in accordance with the driver's manual downshift operation is expanded to a higher rotational speed region where the rotating body is rotated at higher speed, and a hysteresis is provided between an acceptable upper limit speed of any of rotating bodies which are an output shaft of the automatic transmission, a rotating member in the automatic transmission, and an output shaft of the rotation power source, the acceptable upper limit speed being a rotational speed at which the automatic upshift is enabled, and an upper limit downshift permission speed of the rotating body at which the downshift depending on the manual downshift operation is permitted, and the hysteresis is set, depending on a torque of the rotation power source or a physical quantity correlating with the torque as a parameter.

2. The shift controller for an automatic transmission according to claim 1, wherein
the hysteresis is set by:

$$\text{hysteresis} = \Delta nt/T1 \tag{1}$$

where $\Delta nt$ is a variation per unit time in the rotating body, and $T1$ is a minimum time from a manual downshift to an automatic upshift during which a driver of the vehicle does not feel hunting.

3. The shift controller for an automatic transmission according to claim 2, wherein the hysteresis is set as a difference in rotational speed of the rotating body.

* * * * *